United States Patent
Fordahl et al.

(10) Patent No.: US 6,720,567 B2
(45) Date of Patent: Apr. 13, 2004

(54) APPARATUS AND METHOD FOR FOCAL POINT CONTROL FOR LASER MACHINING

(75) Inventors: Craig A Fordahl, Loretto, MN (US); Michael J. Hiebel, Minnetonka, MN (US)

(73) Assignee: GSI Lumonics Corporation, Maple Grove, MN (US)

( * ) Notice: Subject to any disclaimer, the term of this patent is extended or adjusted under 35 U.S.C. 154(b) by 0 days.

(21) Appl. No.: 09/774,276

(22) Filed: Jan. 30, 2001

(65) Prior Publication Data

US 2002/0153500 A1 Oct. 24, 2002

(51) Int. Cl.[7] .............................................. G01N 21/86
(52) U.S. Cl. .............................. 250/559.29; 219/121.83
(58) Field of Search ....................... 250/559.29, 559.38; 219/121.78, 121.83

(56) References Cited

U.S. PATENT DOCUMENTS

| | | | |
|---|---|---|---|
| 3,689,159 A | * 9/1972 | Taniguchi et al. ........... 356/123 |
| 3,851,974 A | * 12/1974 | Ravussin et al. ............ 356/153 |
| 3,969,575 A | 7/1976 | Gerritsen et al. |
| 4,074,104 A | * 2/1978 | Fulkerson ............ 219/121 LM |
| 4,102,571 A | 7/1978 | Hayamizu et al. .............. 356/1 |
| 4,501,961 A | 2/1985 | Stauffer ....................... 250/201 |
| 4,769,523 A | 9/1988 | Tanimoto et al. ......... 219/121.6 |
| 4,789,770 A | 12/1988 | Kasner et al. ............ 219/121.7 |
| 4,839,497 A | 6/1989 | Sankar et al. ........... 219/121.71 |
| 4,918,284 A | 4/1990 | Weisz .................... 219/121.78 |
| 5,063,280 A | 11/1991 | Inagawa et al. ........... 219/121.7 |
| 5,168,454 A | 12/1992 | LaPlante et al. ........ 364/474.08 |
| 5,233,202 A | 8/1993 | Torii et al. .................... 250/561 |
| 5,275,327 A | 1/1994 | Watkins et al. .............. 228/102 |
| 5,304,773 A | 4/1994 | Kilian et al. ............ 219/121.78 |
| 5,340,962 A | 8/1994 | Schmidt et al. ........ 219/121.78 |
| 5,751,588 A | 5/1998 | Freedenberg et al. .. 364/474.28 |
| 5,953,137 A | 9/1999 | Sirat et al. ..................... 359/30 |
| 6,054,673 A | 4/2000 | Chen |
| 6,140,604 A | 10/2000 | Somers et al. ......... 219/121.71 |
| 6,483,071 B1 | 11/2002 | Hunter et al. ............. 219/121.6 |

FOREIGN PATENT DOCUMENTS

| | | |
|---|---|---|
| DE | 36 26 944 A1 | 2/1988 |
| EP | 0 344 339 A1 | 12/1989 |
| EP | 0 470 583 A2 | 12/1992 |
| GB | 1284809 | 6/1970 |
| JP | 57001594 | 1/1982 |
| JP | 09225661 | 2/1996 |

OTHER PUBLICATIONS

Motion—The Guide to Electronic Motion Control, "Motion Control System Integration for High Performance Applications" Fall 1998 (www.motion.org/9804holz.htm).
RAM Optical, "Abbe Error" (www.newport.com/ROI/Applications/appnote3.php).
"VLSI Phased Array Beam Steerer Technology" (www.b-nonlinear.com/VLSI%20beam%20app.htm).
Paul Kuttner, *Laser Beam Scanning, Opto–Mechanical Devices, Systems, and Data Storage Optics*, "Optics for Data Storage, Optical Disk Technology" pp. 303–305 and 331–332, 1985.

* cited by examiner

*Primary Examiner*—Scott J. Sugarman
*Assistant Examiner*—Richard Hanig
(74) *Attorney, Agent, or Firm*—Faegre & Benson LLP

(57) ABSTRACT

Method and apparatus for maintaining the focal point of a laser beam used for laser machining relative to a workpiece, including an optical distance measuring sensor having a measurement beam, a mirror for combining the measurement and laser beams into a predetermined optical path having a common axis for both beams, and a focusing element which may be in the form of a refractive lens or a reflective parabolic mirror located in the optical path, and a control means for controlling the location of the focal point of the laser beam based on the distance sensed by measurement beam. In drilling, once the hole breaks through the workpiece, the application of the laser beam can be stopped by observing a departure from the incremental distance measurement change.

24 Claims, 7 Drawing Sheets

APPARATUS AND METHOD FOR FOCAL POINT CONTROL FOR LASER MACHINING

BACKGROUND OF THE INVENTION

The present invention relates to measurement or control of the distance from a focus point of a laser beam to a material surface of a workpiece to be machined in laser cutting and drilling systems. For simplicity, the term "machining" (and other variations such as "machined") is used herein with respect to the present invention to refer to and is intended to include cutting, drilling, welding and similar operations performed by laser on metal and other materials. Such machining systems require the focus point of the laser beam to be accurately and repeatably located at the surface, or at a predetermined distance from the surface, of a part to be machined. Prior art systems typically used a sensor to detect the distance from the nozzle tip to the part surface. A common type of sensor used in the prior art was based on measuring the capacitance between the nozzle and the part surface. Such capacitance sensors were used to gauge the relative location of the laser beam focal point with respect to the part surface. The nozzle was then moved toward or away from the part surface to maintain a preset capacitance, which in turn was to maintain the laser beam focus point location. This prior art method was found to be satisfactory for part surfaces that are electrically conductive and generally normal to the direction of the laser beam. However, such prior art capacitive sensors were unable to satisfactorily perform with non-conductive part surfaces.

Capacitive sensors also exhibited an undesirable characteristic known as "side sensing" which occurs when the side of the sensing nozzle approaches the part surface or part fixturing. The relative movement of the side of the nozzle contributes to the capacitance change seen by the sensor and an accurate distance between the nozzle tip and part surface to be machined or drilled is no longer maintained. Such undesirable side sensing can occur as a result of part surface geometry, particularly where features that are to be laser processed are located near surfaces that are perpendicular thereto, or nearly perpendicular thereto. Undesirable side sensing influences on capacitance-based measuring systems will result whenever a part surface to be laser processed has a nearby contour projecting out of a plane containing the part surface and other than perpendicular to the laser beam emitted from the nozzle tip towards the part surface.

An example application where the limitations of capacitive sensing are significant is in the drilling of shallow angle holes in turbine engine components which may be formed of or coated with non-conductive material. In such an application, it has been found necessary to position the nozzle at a shallow angle, often as little as 15 degrees with respect to a plane tangent to the part surface at the location to be drilled. At shallow angles such as this, side sensing causes inaccuracies in the measured distance between the nozzle and the part surface. Even if the system is calibrated to compensate for side sensing errors, sensing at shallow angles results in the system sensing part deviations at a location away from the processing point. Because of this, the system may react to a change in material dimension that is not present at the processing point, but is present within the sensing region. Conversely, the system may not react to a change in material dimension at the processing point, when that change is masked or contra-indicated by a change in material dimension away from the processing point. At shallow angles, inaccuracy in the distance measured will not only affect hole quality, due to the focal point being improperly positioned, but will also induce hole location errors due to Abbe error induced at the shallow angle. Although there are methods such as the one described in U.S. Pat. No. 5,340,962 to prevent Abbe error, if the surface is not electrically conductive, the capacitive sensing technique will not accurately sense the actual part surface. Other techniques, such as contact sensors and eddy current sensors are subject to various shortcomings in the application of laser machining and hole drilling of interest here. Contact sensors are not effective because the debris generated by the laser process has been known to accumulate between the sensor and part surface to be sensed, causing erroneous readings. Heat and plasma generated by the laser process have been known to damage eddy current sensors, which must be located at the nozzle tip.

The present invention utilizes a sensor based on the confocal holography principle, and uses equipment available from the Optimet division of Ophir of Jerusalem, Israel. Linear conoscopic holography is explained in U.S. Pat. No. 5,953,137.

Furthermore, unlike certain prior art systems which have an adjustment mode followed by a rearrangement of parts to place the system in an operating mode, the sensor and measurement beam of the present invention is permanently installed and remains operational during machining operations in the practice of the present invention, notwithstanding that the focusing element may be changed, depending upon the application. The present invention also has advantages over the prior art in that the present invention has the ability to track changes in the focal point of the machining laser after changing the focusing element, because of the common optical path including the focusing element, shared by the machining laser and measurement beam. Additionally, because of the shared optical path, including the focusing element, the present invention automatically compensates for thermal effects on the focusing element, an effect known as "thermal lensing" when the focusing element is a lens.

DETAILED DESCRIPTION OF THE INVENTION

Figure 1:
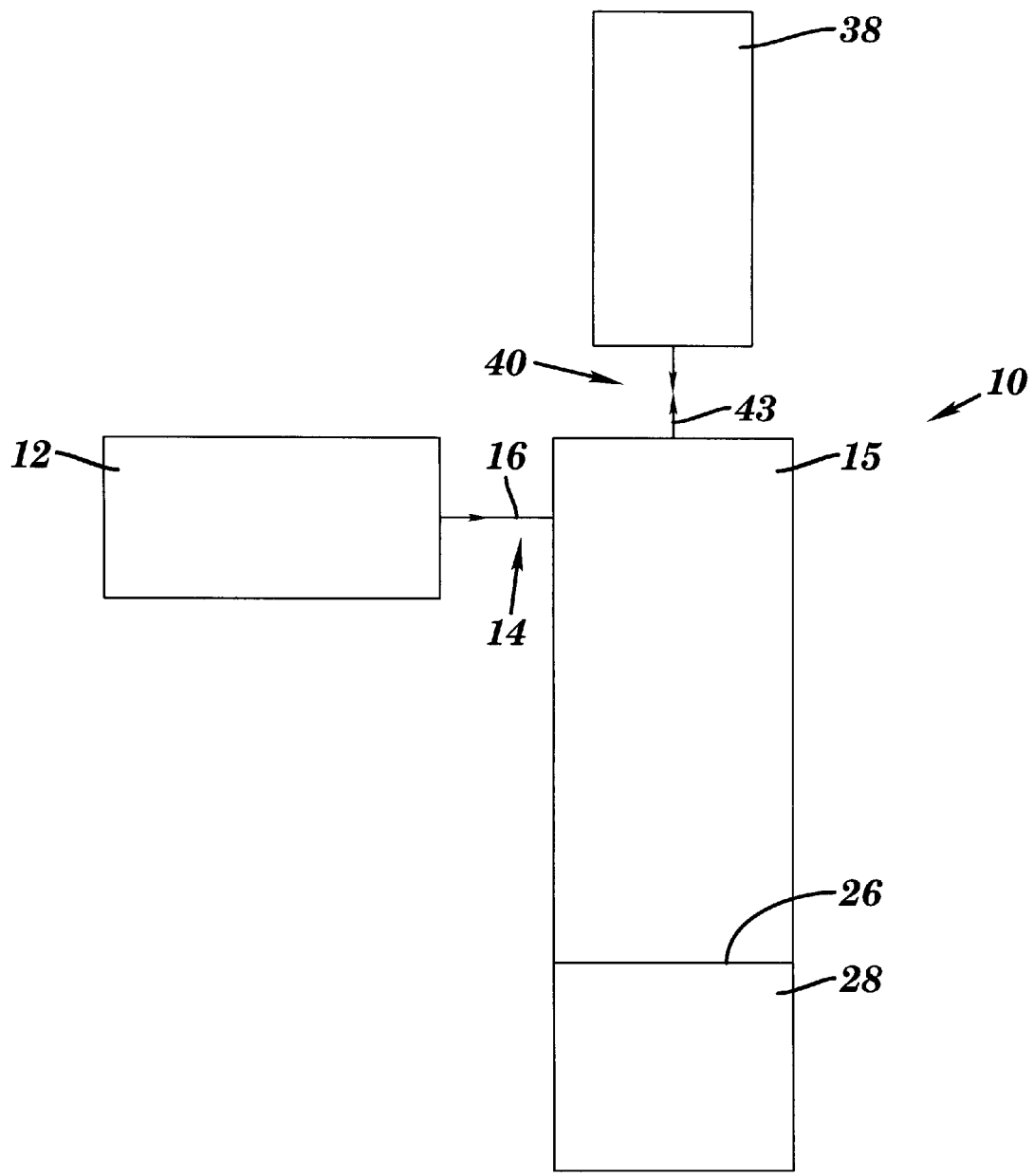
FIG. 1 is a simplified optical block diagram illustrating the present invention.

Referring now to FIG. 1 a block diagram of the system 10 of the present invention may be seen. System 10 preferably includes a primary laser 12 for material machining or other processing which provides a laser beam 14 to a primary optical path 15 along path segment 16. System 10 also includes a sensor 38 which provides a measurement beam 40 along an optical path segment 43. It is to be understood that beams 14 and 40 are combined in and are co-axial in that they share a common axis in at least an output portion of the primary optical path 15 after being combined. Beams 14 and 40 are directed to a part surface 26 of a workpiece 28 which is to be machined by laser beam 14.

Figure 2:
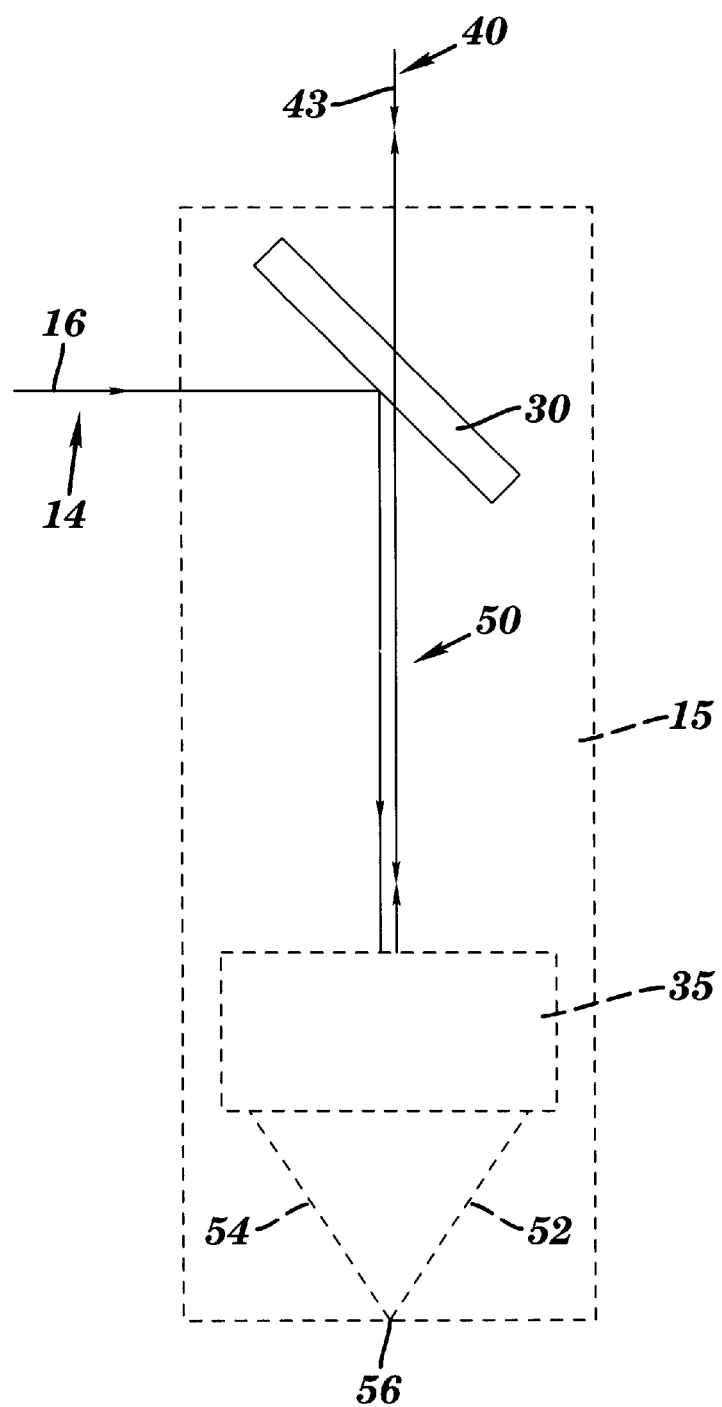
FIG. 2 is a portion of FIG. 1 showing details of a block from FIG. 1 showing details of an optical path useful in the practice of the present invention.
Figure 3:
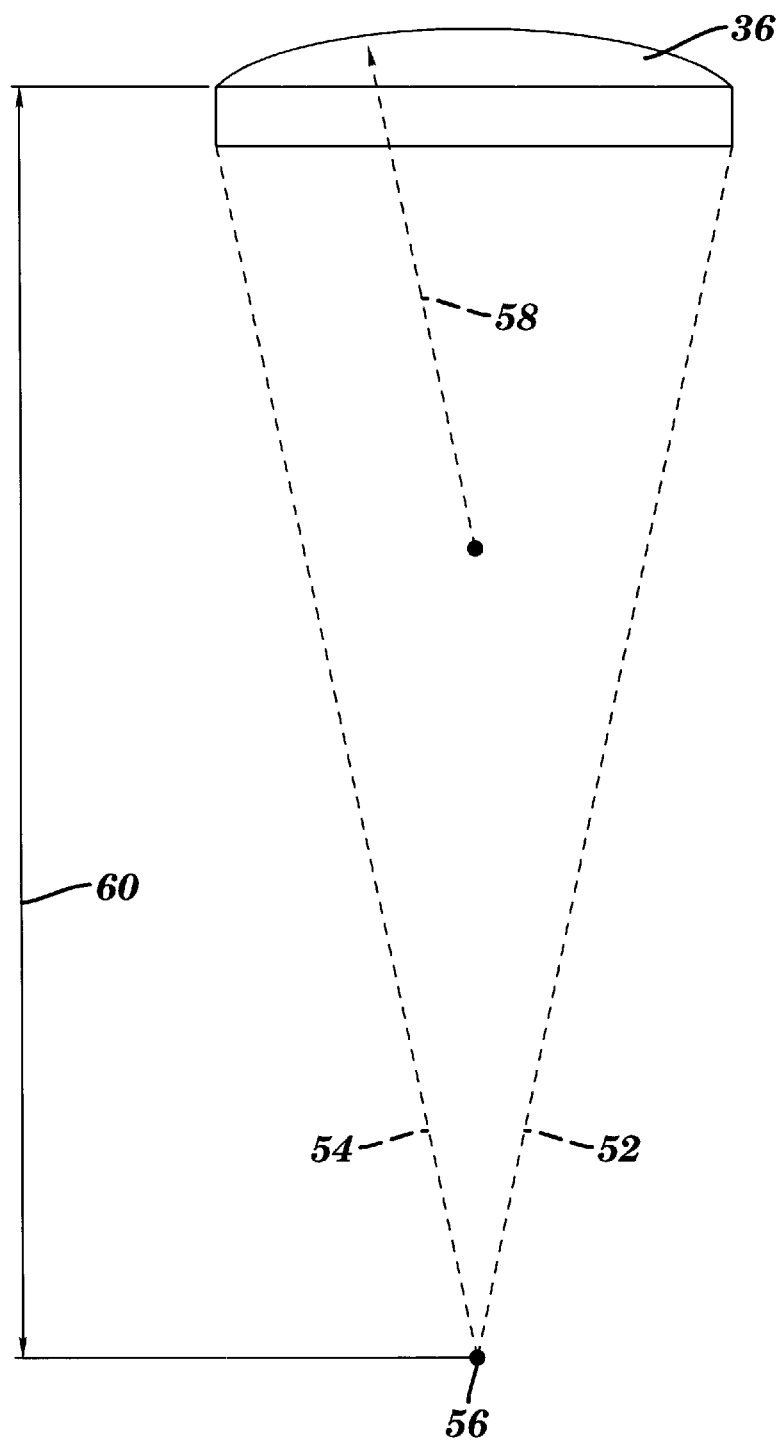
FIG. 3 is an enlarged view of a plano-convex lens used in the practice of the present invention.
Figure 5:
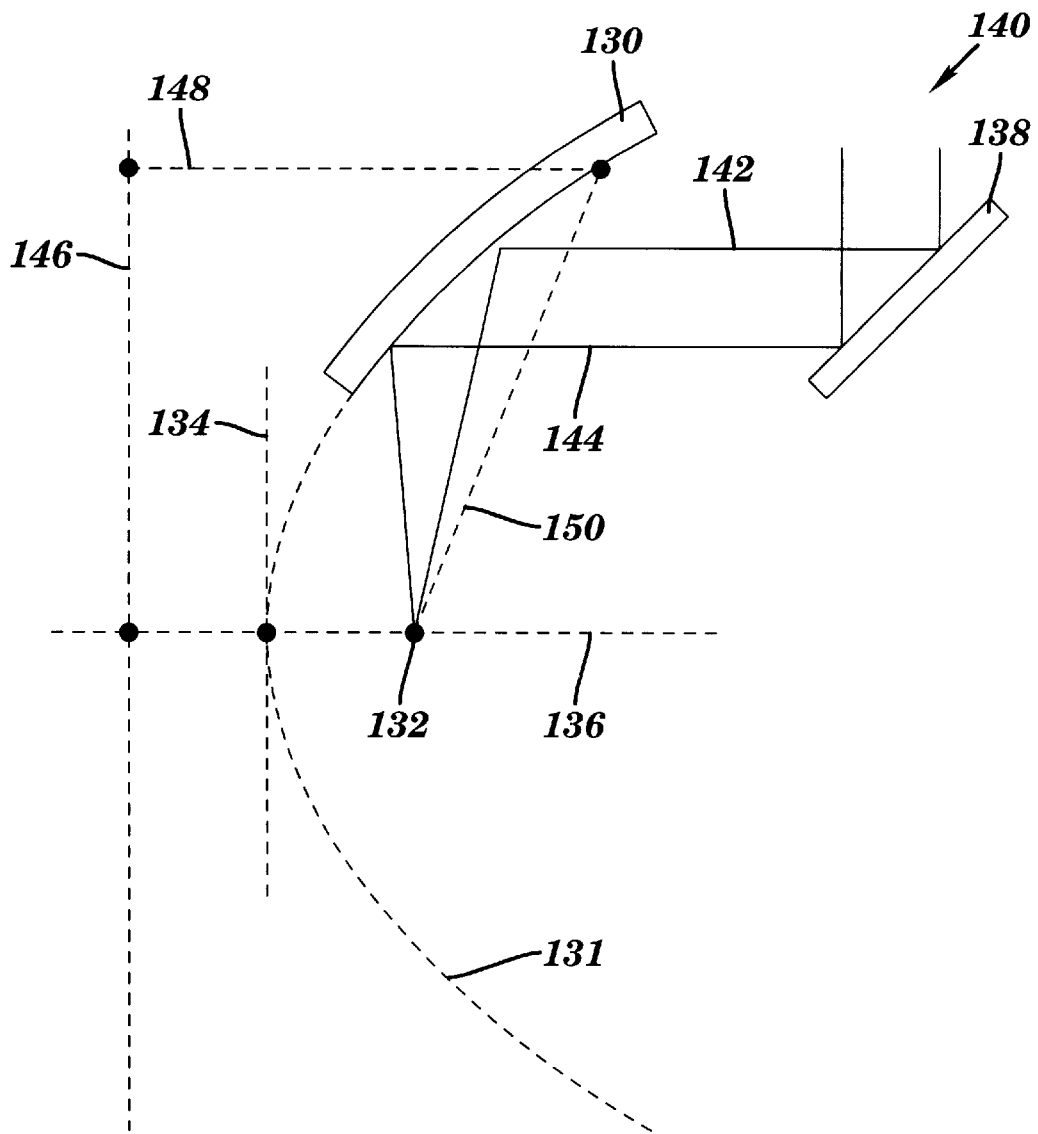
FIG. 5 is a view of a parabolic reflector useful in the practice of the present invention.

Referring now also to FIG. 2, more details of the primary optical path 15 may be seen. Beams 14 and 40 are combined at an optical combining element or dichroic mirror 30 reflective of the laser beam 14 and transmissive to the measurement beam 40. Element 30 is preferably coated on one side with a coating to both reflect the laser beam 14 and transmit the measurement beam 40, and element 30 is also coated on the other side to diminish reflections at the wavelength of the measurement beam so as to enhance transmission of the measurement beam 40 through the element. It is to be understood that element 30 is positioned such that beam 40 will exit element 30 along the same axis as beam 14. (It is to be understood that the figures show beams 14 and 40 separated for illustrative purposes, when in reality, the beams 14 and 40 are superposed on each other.) Both beams are directed along path segment 50 to focusing element 35 which may take the form of a plano-convex lens 36 as shown in FIG. 3, or a parabolic mirror 130 as shown in FIG. 5 or other it may take the form of other known optical focusing devices (not shown). As shown in FIGS. 2 and 3, when element 35 is in the form of lens 36, it provides a focusing effect indicated by lines 52, 54, representative of a focusing distance. Referring now again to FIG. 2, it is to be understood that no matter what form element 35 may take in the practice of the present invention, lines 52 and 54 indicate that parallel light rays (at a single wavelength) will converge at a focal point 56.

Referring now also to FIG. 3, lens 36 preferably has a radius 58 and an effective focal length 60. It is to be understood that lens 36 may be replaced by another lens having a radius different than the radius 58 as shown, if a different focal point is desired. Furthermore, it is important to understand that the focal length 60 and the location of the focal point 56 of lens 36 is a function of the index of refraction, n, of the material from which lens 36 is made, as well as being a function of the radius, R, 58. The effective focal length, EFFL, 60 is $$EFFL = l/(n-1) \quad (1)$$

As is well understood, the index of refraction will have different values for different optical wavelengths. In the practice of the present invention, it has been found desirable to use a fused silica lens material having an index of refraction, n, as follows

TABLE 1

| nominal wavelength (nm) | index of refraction, n |
|---|---|
| 685 | 1.45564 |
| 1064 | 1.44963 |

Because of the difference in the values for the index of refraction at different optical frequencies, there will be an offset between the effective focal lengths at the different optical frequencies. Using, for example, a radius, R, of 103 mm for lens 36, the effective focal length EFFL for each wavelength is as shown in Table 2.

TABLE 2

| nominal wavelength (nm) | EFFL (mm) |
|---|---|
| 685 | 226.06 |
| 1064 | 229.08 |

The difference in focal points between these values is 3.02 mm. It is to be understood that lenses of other focal lengths or indices of refraction may (alternatively) be used in the practice of the present invention.

Figure 4:
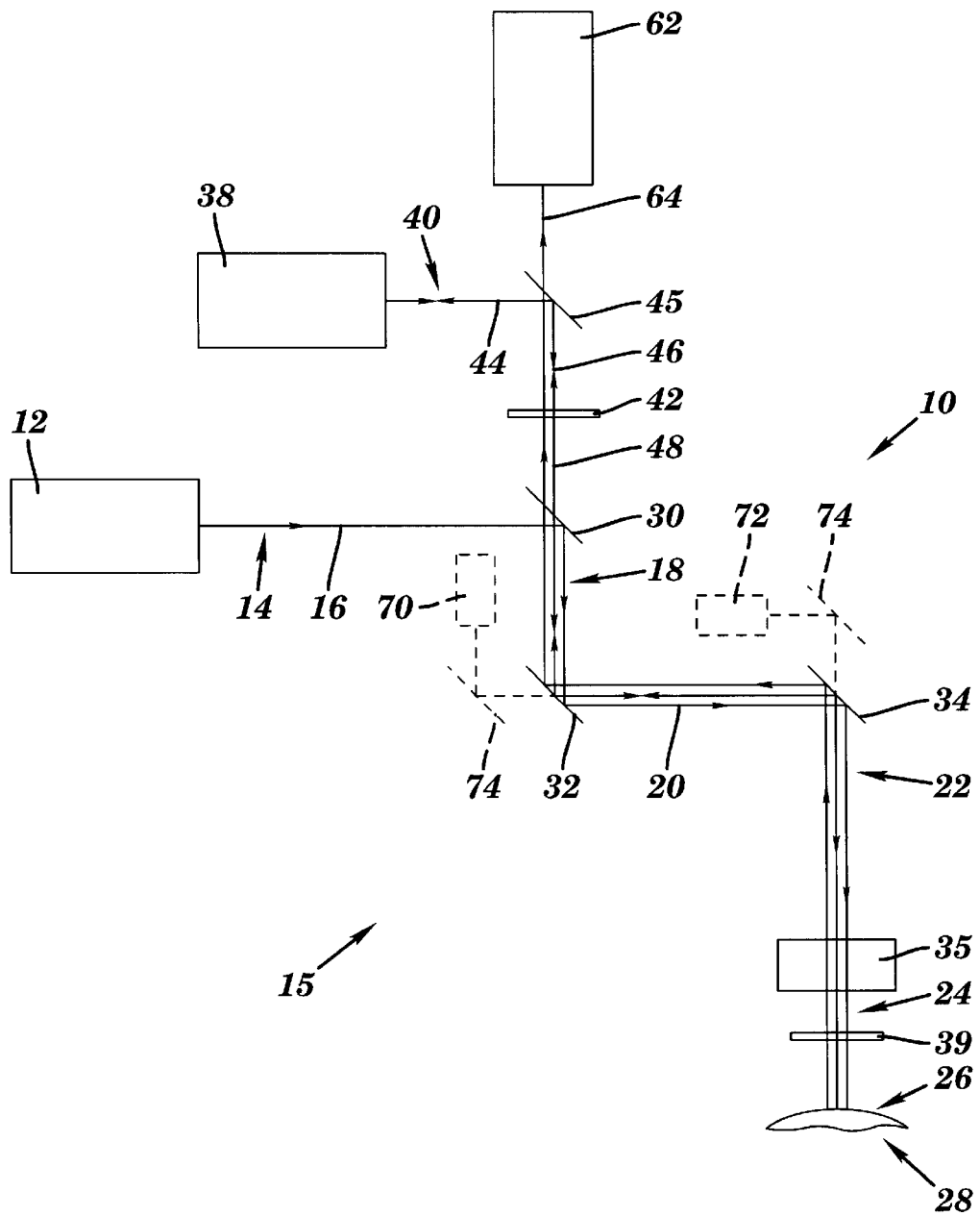
FIG. 4 is a more detailed, but still simplified optical schematic illustrating details of the present invention.

Referring now to FIG. 4, a simplified schematic of the system 10 for measuring distance for laser machining may be seen. System 10 includes the primary laser 12, which may, for example, be a Nd:YAG laser or a $CO_2$ laser. It is to be understood that primary laser 12 is the device which provides the laser beam 14 for machining. As shown in system 10, beam 14 is emitted from laser 12 along segment 16 and then progresses through the primary optical path 15 having path segments 18, 20, 22, and 24. Segment 24 is directed to a part surface 26 of a workpiece 28 on which laser machining is to be accomplished.

Laser 12 is preferably a YAG type, preferably operating at 1064 nm, and may, for example, be a JK 704 TR type available from GSI Lumonics Corporation, at 22300 Haggerty Road, Northville, Mich. 48167, with a maximum mean power of 370 watts, a pulse energy of between 0.2 and 60 Joules, a maximum peak power of 30 Kw, a pulse width range of 0.2 to 20 microseconds and a maximum repetition rate of 150 Hz. A mirror or element 30 is preferably placed in path segment 16 to intercept beam 14. Element 30 (along with other such elements described infra) is preferably a 2.0 inch diameter by 0.25 inch thick mirror formed of fused silica, available from conventional sources of such optical elements. Element 30 preferably has an antireflective coating for visible light wavelengths, including the wavelength of the sensor 38, in this example 685 nm. Element 30 is an optical combining element and, in this embodiment, is designed to transmit light from visible wavelengths including the wavelength of the measurement beam 40 and to reflect light at the wavelength of the laser 12. For this example, mirror 30 has an antireflective coating for visible wavelengths, including 685 nm. Because the wavelength of the antireflective coating is limited as described, mirror 30 reflects beam 14 along the primary optical path segment 18. A second mirror 32 reflects beam 14 along a further optical path segment 20. A third mirror 34 reflects beam 14 along a still further primary optical path segment 22. Mirrors 32 and 34 each are reflective for visible light through the wavelength of laser 12, in this example, 1064 nm. Beam 14 then passes through the focusing element 35 where it is focused in the final primary optical path segment 24 and impinges on part surface 26 of the workpiece 28. Normally, element 35 is positioned to focus the energy of beam 14 at a desired point on part surface 26. When lens 36 is used a the focusing element 35, lens 36 preferably has a diameter of 1.5 inches and a thickness of 0.236 inches. It is to be understood that mirrors 32 and 34 are included in the embodiment of FIG. 4 only for convenience in positioning the beams 14 and 40 with respect to the system 10 and workpiece 28. Accordingly, mirrors 32 and 34 (and other mirrors, if desired) are optional in the practice of the present invention. A replaceable cover slide 39 is positioned between element 35 and the part surface 26 of workpiece 28 to protect element 35 from material discharged from workpiece 28 during laser machining. Slide 39 is preferably formed of fused silica and is coated to enhance transmission of visible wavelengths thorough the wavelength of laser 12, and to prevent reflectance at the measurement beam wavelength.

System 10 also includes an optical measuring system 38 which may be in the form of a laser diode system available as a model Conoprobe 1000 from Optimet Division (located at 9 Electronics Ave., Danvers, Mass. 01923 USA) of Ophir Optronics, Ltd. of Science-Based industrial Park, Har Hotzvim, P.O. Box 45201, Jerusalem 91450, Israel. It has been found useful to have measuring system 38 operate at a different optical frequency from primary laser 12, to enable separation of the laser beam 14 from a measurement beam 40 of the system 10. To that end, in the preferred form of the invention, the wavelength of the measurement beam 40 is nominally 685 nanometers.

In system 10, illumination in the form of the measurement beam 40 from a laser diode source (not shown, but located in system 38) is combined into the primary optical path 15 of the laser machining system 10. It is to be understood that the primary optical path includes the route from mirror 30 to the workpiece 28, and that measurement optical path 43 includes segments 44, 46 and 48. More specifically, before reaching the primary optical path 15, measurement beam 40 initially may be directed through a first measurement optical path segment 44 and then reflected by mirror 45 to a second measurement optical path segment 46. Mirror 45 is preferably a 2.0 inch diameter by 0.25 inch thick element formed of fused silica and having a visible anti-reflective coating to make mirror 45 transmissive for wavelengths between 400 and 630 nm and reflective to beam 40 at 685 nm. The measurement beam 40 at segment 46 may be directed through a filter 42 before progressing to measurement optical beam path segment 48, where it passes through the optical combining element or mirror 30 as it enters the primary optical path 15. If used, filter 42 is preferably formed of fused silica. Alternatively, mirror 45 and filter 42 may be combined into a common element 45. The purpose of filter 42 (whether a separate element or combined in element 45) is to block reflected stray optical energy at the wavelength of the laser 12 (in this example, 1064 nm) and may be used to block other undesired wavelengths which may be transmitted through element 30. The sensor 38 may alternatively be located at either position 70 or 72, as desired, with appropriate changes to element 32 or 34 to permit transmission of the measurement beam 40 therethrough, in addition to providing for reflection of the laser beam 14. In the event of positioning sensor 38 at location 70 or 72, it has been found desirable to include an additional mirror 74 to "fold" the optical path of sensor 38, enabling a more condensed physical arrangement.

It is to be understood that measurement beam 40 is focused using the same focusing lens 36 as the primary laser beam 14. The laser 12 can be of arbitrary wavelength, with changes to a refractive element 35 made accordingly. If a reflective element 35 is used, changes may only be needed to be made to the coating. Appropriate changes are also to be made to the coatings of the various other optically reflective and transmissive elements, to accommodate a different wavelength for laser 12. It is further to be understood that the present invention may be practiced with a wavelength of laser beam 14 shorter than that of measurement beam 40 with appropriate changes in the optics.

The optical measurement beam 40 strikes the workpiece 28 at part surface 26 and a portion of the light energy is reflected back through the primary optical path 15. The reflected measurement beam 40 is transmitted through the mirror 30 and then passes through the laser beam blocking filter 42 (if used) before returning to the sensor 38. The returning energy in the reflected measurement beam 40 is examined by the sensor (based on U.S. Pat. No. 5,953,137) and the location of the reflecting part surface 26 is determined relative to the focal point of the laser diode light measurement beam 40 passing through lens 36. A numerical value representative of the location of the reflecting part surface 26 on the workpiece 28 is returned by sensor 38 to the system 10 to determine the location of the primary laser beam focal point. The focal point location of the primary laser beam 14 is determined relative to the focal point of the laser diode light or measurement beam 40, by the following equation:

$$FPFP_{14} = FP_{40} + \text{OFFSET} \tag{2}$$

where $FP_{14}$ is the focal point of the laser beam 14 and $FP_{40}$ is the focal point of the measurement beam 40, and OFFSET is the difference between the two, because of the difference in the value of the index of refraction at the operating frequencies or wavelengths of the primary laser 12 and the light source of the sensor 38.

These two pieces of information, the location of the workpiece relative to the focal point of the measurement beam 40, and the location of the focal point of the primary laser beam 14 relative to the focal point of the measurement beam 40, are used by the positioning part of the machine tool apparatus carrying system 10 to determine the change in location of the part surface. From this information, one or more of the machine axes is adjusted to locate the focal point of the primary laser beam 14 at the desired location in space. These machine adjustments may be along an axis of the primary laser beam 14 (i.e., along or parallel to segment 22), or along any predetermined machine vector as described by Schmidt, et al. in U.S. Pat. No. 5,340,962, (the contents of which are hereby incorporated by reference) or along any other desired path. The teaching of U.S. Pat. No. 5,340,962 may be used in the practice of the present invention, with the capacitive sensor replaced by the sensor 38 and measurement beam 40. As has been stated, using the optical sensor 38, especially when arranged in a co-axial optical path with the processing or machining laser beam 14, avoids the shortcomings of the capacitance type sensor.

It is to be further understood that the present system may be used with lenses or reflectors of various focal lengths, as desired. Furthermore, although only a simple plano-convex lens (of the spherical kind) is shown, it is within the scope of the present invention to use more than one lens, if desired, or other lens types or geometries such as concave-convex, for example.

Referring now most particularly to FIG. 5, alternatively, it is within the scope of the present invention to use a concave mirror, (most preferably a parabolic mirror) 130 as a reflective optical element 35, in contrast to the refractive element shown as lens 36 in other figures. The mirror 130 is a portion of a parabola 131, defined by the equation:

$$y^2 = 2px \tag{3}$$

where the focus 132 is at coordinates p/2, 0, with line 134 being the ordinate or y axis, and line 136 being the abscissa or x axis. An additional mirror 138 may be used to reflect a beam of light 140 (the boundaries of which are indicated by lines 142, 144) into the parabolic mirror 130. Line 146 is the directrix of the parabola 131, and lines 148 and 150 are of equal length, extending to the parabola 131, respectively from the directrix 146 and the focus point 132.

Referring now again to FIG. 4, although not part of the present invention, it has been found desirable to include a CCTV camera 62 and monitor (not shown) to respond to visible light reflected from the workpiece 28 along optical path 15 ending in segment 64. Camera 62 enables direct observation of the workpiece and the results of the laser machining performed by system 10. Camera 62 may also be used to view the visible wavelength measurement beam focal point.

Figure 6:
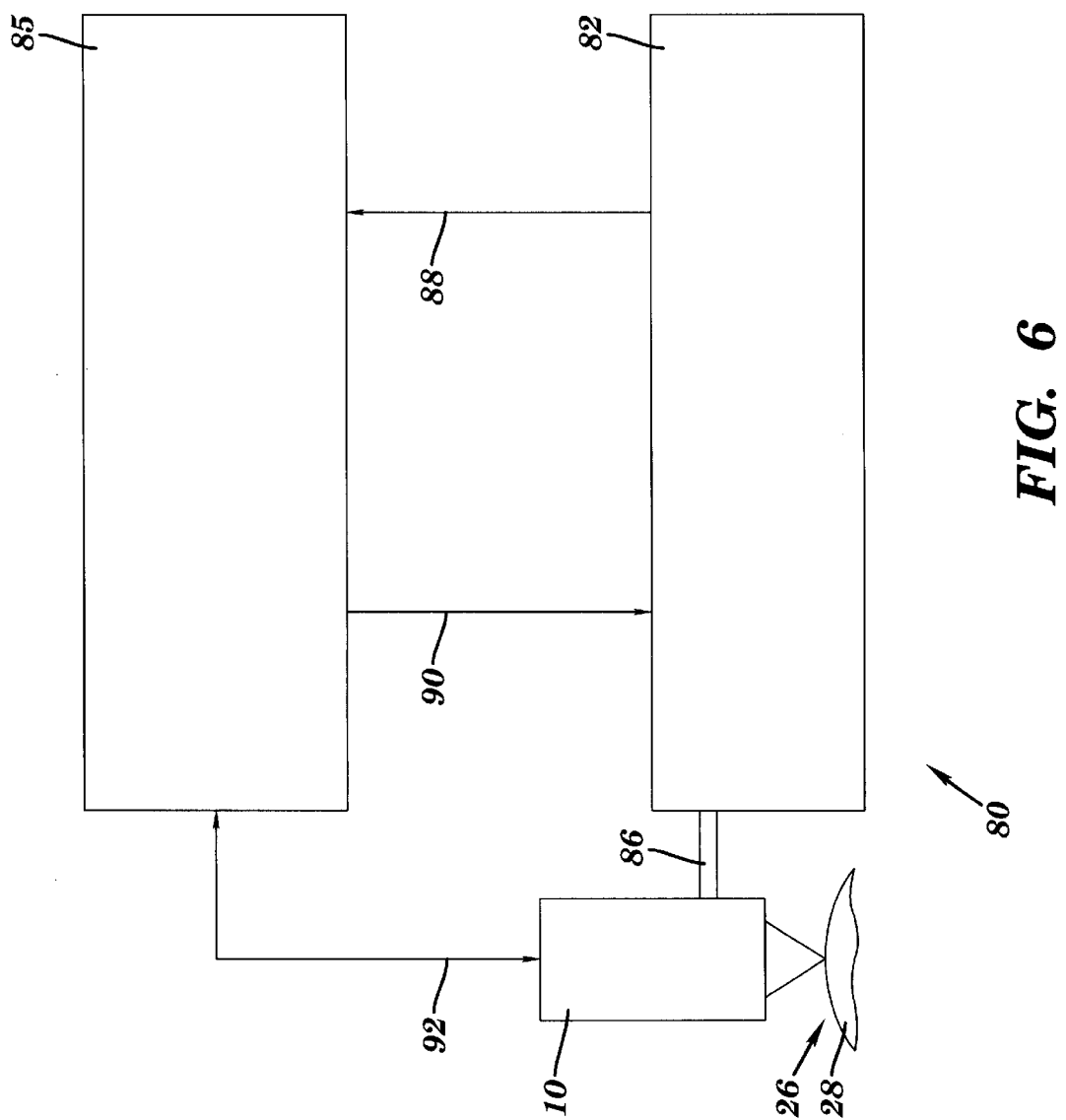
FIG. 6 is a simplified block diagram of a control system useful in the practice of the present invention.

Referring now also to FIG. 6, a simplified block diagram 80 of a control system useful in the practice of the present invention may be seen. Block diagram 80 includes a multi-axis positioner 82, a computer controller 85 and the optical system 10 shown in FIG. 4. The positioner 82 is mechanically connected to system 10, as indicated by connection 86. Positioner 82 sends position signals to the controller 85 via line 88 and receives movement commands via line 90 from the controller 85. System 10 transmits data to and receives instructions from controller 85 via line 92. It is to be understood that lines 88, 90, and 92 are each multi-wire connections.

Figure 7:
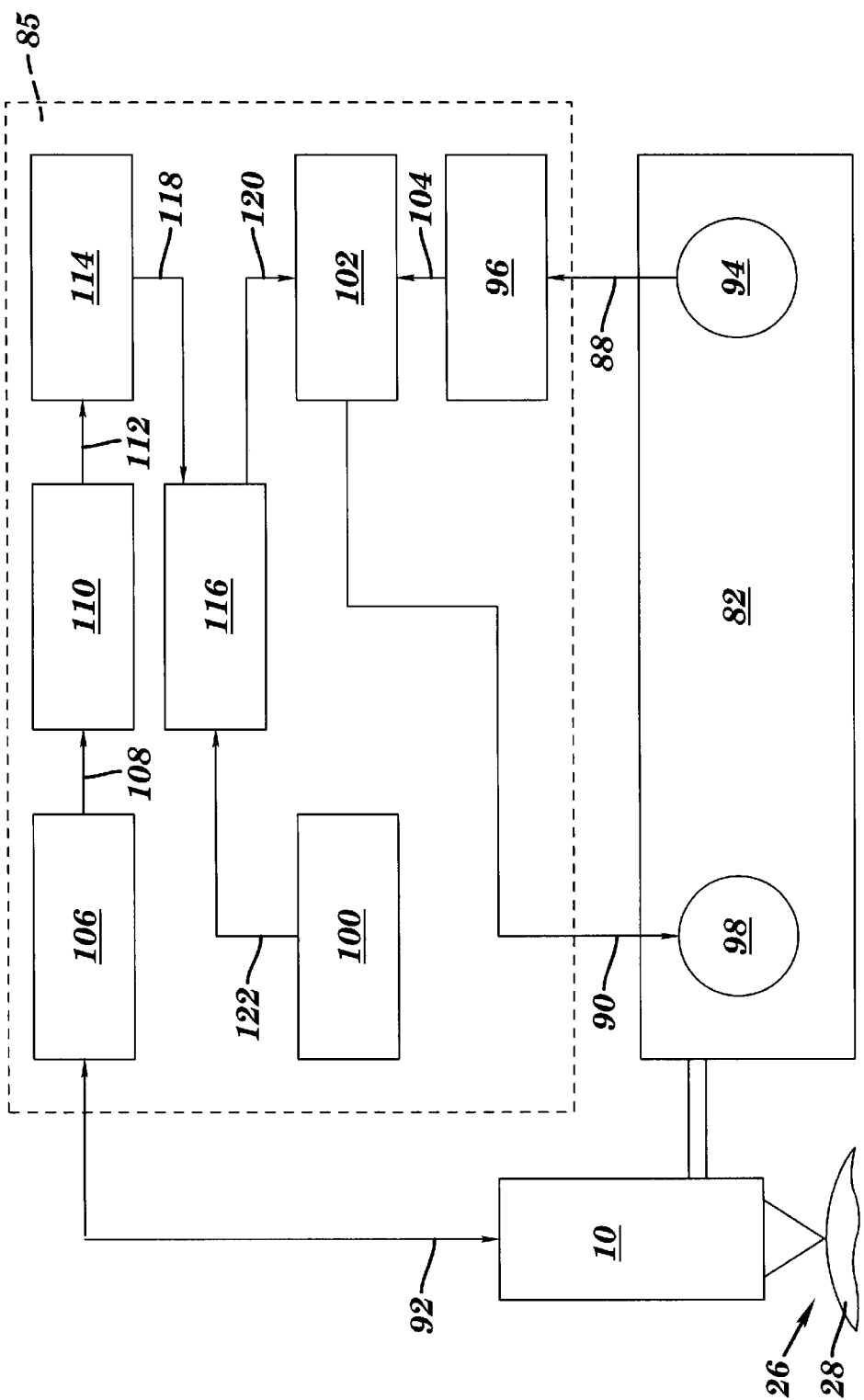
FIG. 7 is a more detailed block diagram of the control system shown in FIG. 6.

Referring now also to FIG. 7, more details of block diagram 80 may be seen. Positioner 82 has encoders 94 to provide position information at a Position block 96, via line 88. Computer controller 85 has a Proportional-Integral-Differential/Acceleration Feed Forward (PID/AFF block 102 which receives and processes the position feedback information from Position block 96 via line 104. Position information from the sensor 38 of the system 10 is received in the computer controller 85 via line 92 at a second Position block 106. This information is delivered via line 108 to a Proportional-Integral block 110 and then via line 112 to a Sensor Error Value block 114. The Sensor Error Value block 114 transmits a signal to a Summing block 116 via line 118. A Program Position block 100 delivers a position command based on a trajectory defined in a part program to the Summing block 116 via line 122. The Summing block 116 sums the Program Position block output with the output of the Sensor Error Value block 116 and generates a composite position command which is sent to the PID/AFF block 102 via line 120. Positioner 82 also has motors 98 to move the system 10 as directed by the PID/AFF block 102 via line 90 in 5 axes, translating in x, y and z directions, and providing two degrees of rotational freedom, since there is no need to provide rotation about the axis of the output of the primary optical path. Commands are also transmitted via line 92 to activate and deactivate the primary laser 12, and to activate and interrogate the sensor 38.

In operation, closed loop control is maintained for the position of the focal point of the machining laser 12 relative to the part surface 26 being machined through the coaxial primary optical path 15 of the measurement beam 40 and the machining laser beam 14.

The measurement sensor 38, with a coaxial beam path with the machining laser 12, generates an output value (either digital or analog) based on the position of the part surface 26 relative to the focal point of the sensor 38. This data from the measurement sensor 38 is fedback to the computer controller 85, which preferably is a CNC (Computer Numerical Control) machine tool assembly carrying and positioning system 10 using positioner 82. The computer controller 85 stores a reference value from the sensor 38 which represents a fixed distance relationship between the sensor focal point and the part surface 26 being machined. During the machining process the computer controller 85 generates a focal point position error value based on a difference between the sensor actual position feedback versus the stored expected position. This error value is processed through an algorithm with proportional and integral terms that generates a Sensor Error vector in block 114. The Sensor Error vector is summed with the program position command from block 100 in the Summing block 116 and is delivered to the PID/AFF block 102 via line 120 which applies the individual position commands via line 90 of the positioner axes motors 98 correcting the focal point position error. The focal point of the sensor laser beam (the measurement beam 40) and the machining laser beam 14 have a fixed relative position to each other for a given focusing element 35 therefore controlling the measurement beam focal point in relationship to the part surface 26 controls the machining laser focal point in relationship to the part surface 26.

A further application is to use the sensor 38 in a closed loop control mode, before the machining process, to map the position error of the surface being machined from the programmed part path, storing that data in the CNC 85. The CNC applies that error in the algorithm mentioned above during the machining process for closed loop focal point position error correction.

In at least one specialized mode of operation (percussion drilling) it has been found useful to position the nozzle containing the focusing element only once with respect to the initial surface of the workpiece. In this mode, it is not necessary to advance the nozzle during subsequent processing (i.e., as the hole advances through the workpiece, and it may in fact be desirable not to do so, to avoid mechanical interference between the workpiece and the nozzle.

An additional capability of the present system is to detect break through. Using this system, the data from the sensor can be interpreted to detect when the laser beam 14 has pierced the back side of the material being processed, in effect, detecting when the laser beam 14 breaks through the thickness of the material of workpiece 28. With a pulsed laser source, the sensor reading acquired during the off time of the laser beam can be analyzed to determine the surface location of the material directly in the path of the primary laser beam energy (i.e., in the "bottom" of the hole or recess being drilled or machined away). When a pulsed laser source is drilling through or otherwise removing material at a rate of less than one material thickness per pulse, the location of the part surface in between pulses will provide the current depth of the (as yet blind) hole. Once the primary laser beam breaks through the back side of the material, effectively having drilled or otherwise machined through the entire thickness of the part, the sensor reading will jump to a value that is greatly different than the immediately preceding value or values. The measurement sensor 38 may return an "out of range" value, indicating that the last reading (after break through) is significantly different from the trend of recent readings prior to break through. However, in certain parts, a nearby surface of the part may be in line with and close enough to the hole location to produce a valid or "in-range" sensor reading. Even in this case, the indicated change in depth between successive readings just before and just after breakthrough will ordinarily be significantly larger than successive changes in readings occurring before breakthrough. This change at breakthrough will be sufficiently large to detect that the primary laser beam has processed the entire material thickness (break through). When break through is detected, the system 10 stops the processing of the hole or piercing operation and continues with the next part program command.

This process greatly improves processing cycle time. Without knowledge of when the breakthrough occurs, the part program must provide for a sufficient number of laser pulses to occur to ensure that the material is processed all the way through in a worst case condition. This generally results in the programming of several more pulses for each piercing operation than is actually required. By programming additional pulses, operation is continued for a sufficient duration to assure that the pierce through will occur and the workpiece will not need to be reworked or scrapped.

Parts or workpieces such as turbine engine components or solder stencil screens typically have thousands of pierce through operations on a single part. With the present method of detecting break through of the primary laser beam, substantial cycle time can be eliminated. For example, consider a turbine engine combustion liner having 4000 holes, with each hole requiring a complete pierce through of the material. A typical part program of this nature would likely have had at least 5 extra pulses programmed per pierce without break through detection, due to the complexity and monetary value of these parts. By eliminating 5 extra pulses per hole at a typical pulse rate of 15 pulses per second, the cycle time is reduced by 1333 seconds (over 22 minutes).

This invention is not to be taken as limited to all of the details thereof as modifications and variations thereof may be made without departing from the spirit or scope of the invention.

What is claimed is:

1. A method for maintaining a focal point of a machining laser beam relative to a surface of a part to be machined comprising:

directing the machining laser beam having a first fixed focal point and a measurement beam having a second fixed focal point onto the surface through a common beam focusing element and along a substantially coaxial path, said first focal point and said second focal point having a known separation distance along an optical axis of the focusing element;

receiving a portion of the measurement beam reflected from the surface in a beam sensor element and determining a first separation distance between the measurement beam second focal point and the surface;

generating an error signal representative of a second separation distance between the machining laser beam first focal point and the surface based on the measured first separation distance and the known separation distance; and summing the error signal with a position command signal for moving the part to be machined with respect to the machining laser beam such that the machining laser beam first focal point remains substantially coincident with the surface during movement thereof.

2. The method of claim 1 wherein the beam focusing element is a plano-convex lens.

3. The method of claim 1 wherein the beam focusing element is a parabolic reflector.

4. A method according to claim 1 wherein the part is supported for controlled movement in five axes, further comprising the step of:

processing the error signal to develop a sensor vector error signal; and, summing the sensor vector error signal with a composite position command for moving the part such that the machining laser beam first focal point remains substantially coincident with the surface for any surface orientation.

5. The method of claim 1 wherein the laser machining beam is used for drilling a hole in the part, and wherein the step of receiving the portion of the measurement beam reflected from the surface in a beam sensor element further comprises the step of determining a depth of a hole being drilled by the laser machining beam.

6. The method of claim 1 wherein the laser machining beam is used for drilling a through hole in the part, and wherein the step of receiving the portion of the measurement beam reflected from the surface in a beam sensor element further comprises the step of determining when the laser machining beam breaks through the part.

7. A method for machining with a laser beam, the method comprising the steps of:

a) determining a location of a part surface of the workpiece using a measurement beam from an optical sensor directed along an optical axis and through an optical focusing element to focus the measurement beam at a measurement beam focal point, said measurement beam having a first wavelength;

b) machining the workpiece using a laser beam having second wavelength different from the first wavelength directed along the optical axis with the measurement beam and through the optical focusing element to focus the laser beam at a laser beam focal point;

c) controlling the location of the focal point of the laser beam with respect to the part surface of the workpiece based on the location sensed by the measurement beam while accommodating the difference in the location of the focal points in determining the location of the workpiece such that the laser beam focal point is positioned at a desired location with respect to the workpiece for laser machining.

8. The method of claim 7 wherein the wavelength of the laser beam is about 1064 nanometers and the wavelength of the measurement beam is about 685 nanometers.

9. A method of detecting break through from a blind hole to a through hole in a workpiece during laser machining comprising the steps of:

a) sharing an optical path by a sensor and a laser wherein:
   i) an optical measurement beam of a first wavelength is delivered and sensed by the sensor for sensing a location of a surface of a workpiece, and
   ii) a laser beam of a second wavelength different than the first wavelength is generated by the laser for machining a surface of the workpiece wherein the optical path includes an optical focusing element for focusing both beams, said focusing element having distinct and separate focal points for the optical measurement beam and said laser beam the separate focal points having a known focal separation along an optical axis of the focusing element;

b) directing the optical measurement beam through the optical path to determine a separation distance between the focal point of the measurement beam and a surface of the workpiece;

c) moving the surface of the workpiece to adjust the separation distance between the focal point of the measurement beam and the surface of the workpiece to position the focal point of the laser beam substantially at a desired location relative to the surface of the workpiece;

d) directing a laser beam through the optical path to the workpiece to remove material from the surface thereby forming a new surface; and e) comparing the present distance sensed with the last location sensed and repeating at least steps b) and d) and e) when the difference between the present location sensed and last location sensed is less than a predetermined value.

10. The method of claim 9 further comprising an additional step:
   f) discontinuing at least step d) when the difference is greater than the predetermined value.

11. The method of claim 9 wherein the optical measurement beam and the laser beam have different wavelengths, and step c) further comprises applying a correction to the optical measurement beam to compensate for a difference between the locations of the respective focal points of the beams.

12. The method of claim 9 wherein step e) is performed during a piercing operation of the laser machining.

13. The method of claim 9 wherein step e) is performed during a drilling operation of the laser machining.

14. Apparatus for measuring the location of a focal point of a laser machining beam with respect to a surface of a workpiece to be machined by the beam comprising:
   a) a laser machining system having a laser beam of a first optical wavelength directed along a predetermined optical machining path;
   b) an optical measuring sensor having a measurement beam of a second optical wavelength that is different than the first optical wavelength directed along at least a part of the optical machining path; and
   c) an optical focusing element having a different predetermined focal length characteristic with respect to said first and said second optical wavelengths, the optical focusing element being located in a shared portion of the optical machining path such that the focal length characteristic of the optical focusing element simultaneously provides a measurement focal length for the optical distance measuring sensor using the measurement beam and an operating focal length for optical machining using the laser beam.

15. The apparatus of claim 14 wherein the optical focusing element is a refractive type optical element.

16. The apparatus of claim 15 wherein the optical focusing element is a lens.

17. The apparatus of claim 14 wherein the optical focusing element is a reflective optical element.

18. The apparatus of claim 17 wherein the optical focusing element is a concave mirror.

19. The apparatus of claim 18 wherein the concave mirror is a parabolic mirror.

20. The apparatus of claim 14 further comprising a beam combining element for receiving the laser beam along a first axis and the measurement beam along a second axis different from the first axis and for combining the laser beam and measurement beam into the optical machining path.

21. The apparatus of claim 20 wherein the beam combining element reflects one of the beams and transmits the other of the beams to combine the beams along a common axis.

22. The apparatus of claim 14 wherein the first axis is located 90 degrees with respect to the second axis and the beam combining element is an optical element positioned and coated to reflect one of the laser beam and measurement beam and transmit the other of the laser beam and measurement beam.

23. The apparatus of claim 14 wherein the first optical wavelength is nominally 1064 nanometers.

24. The apparatus of claim 23 wherein the second optical wavelength is nominally 685 nanometers.

* * * * *

UNITED STATES PATENT AND TRADEMARK OFFICE
CERTIFICATE OF CORRECTION

PATENT NO. : 6,720,567 B2
DATED : April 13, 2004
INVENTOR(S) : Craig A. Fordahl et al.

It is certified that error appears in the above-identified patent and that said Letters Patent is hereby corrected as shown below:

Column 10,
Line 63, delete "distance" and insert therefor -- location --

Signed and Sealed this

Twenty-seventh Day of July, 2004

JON W. DUDAS
*Acting Director of the United States Patent and Trademark Office*